United States Patent
Sheaffer

[19]

[11] Patent Number: 5,975,024
[45] Date of Patent: Nov. 2, 1999

[54] CAGE FOR RECEIVING A FEEDER

[75] Inventor: John Sheaffer, Perryville, Md.

[73] Assignee: Lab Products, Inc., Seaford, Del.

[21] Appl. No.: 08/962,400

[22] Filed: Oct. 31, 1997

[51] Int. Cl.[6] .......................... A01K 39/01; A01K 39/00
[52] U.S. Cl. .................... 119/477; 119/464; 119/51.12
[58] Field of Search .................................. 119/464, 475, 119/476, 477, 478, 456, 457, 51.12, 51.11; 222/650, 168.5, 354

[56] References Cited

U.S. PATENT DOCUMENTS

| | | |
|---|---|---|
| 1,719,769 | 7/1929 | Kaufman . |
| 1,869,901 | 8/1932 | Le Fever ..................................... 119/61 |
| 2,528,742 | 11/1950 | Coffing . |
| 2,753,840 | 7/1956 | Patrie . |
| 2,943,600 | 7/1960 | Rosoff ..................................... 119/464 |
| 3,046,939 | 7/1962 | Vlach . |
| 3,050,029 | 8/1962 | Appleton . |
| 3,361,116 | 1/1968 | Daniel et al. ............................. 119/464 |
| 3,468,291 | 9/1969 | Allen . |
| 3,999,519 | 12/1976 | Rodemeyer . |
| 4,000,719 | 1/1977 | Richards et al. . |
| 4,059,072 | 11/1977 | Vassallo et al. . |
| 4,422,409 | 12/1983 | Walker et al. . |
| 4,450,790 | 5/1984 | Stansbury, Jr. . |
| 4,485,765 | 12/1984 | Schwartz et al. . |
| 4,492,183 | 1/1985 | Chiotasso et al. . |
| 4,617,874 | 10/1986 | Zammarano . |
| 4,671,210 | 6/1987 | Robinson et al. . |
| 4,981,106 | 1/1991 | Nagatomo ............................. 119/51.11 |
| 4,989,547 | 2/1991 | Eaton . |
| 5,152,247 | 10/1992 | Brown ....................................... 119/18 |
| 5,199,381 | 4/1993 | Masopust . |
| 5,377,620 | 1/1995 | Phillippi ............................... 119/51.12 |
| 5,435,266 | 7/1995 | Carson ..................................... 119/464 |

FOREIGN PATENT DOCUMENTS

| | | |
|---|---|---|
| 464942 | 5/1937 | United Kingdom . |
| 2 166 934 | 5/1986 | United Kingdom . |
| 2199477 | 7/1988 | United Kingdom . |

Primary Examiner—Thomas Price
Assistant Examiner—James S. Bergin
Attorney, Agent, or Firm—Stroock & Stroock & Lavan LLP

[57] ABSTRACT

A cage for receiving a multiple dosage feeder is provided. The multiple dosage feeder includes a food holding feeder member and a feeder housing member disposed in an opening in the cage. The food holding member holds a plurality of measured dosages of food or other substances, and at least a portion of the food holding member extends to the cage-interior side of the opening. A snap lock releasably secures the feeder housing member to the wall of the multiple dosage feeder. At least a portion of the food holding member is rotatable within the housing member so as to expose the single dosage of the plurality of dosages, while the housing member prevents access to any remaining dosages on the cage-interior side of the opening.

11 Claims, 5 Drawing Sheets

CAGE FOR RECEIVING A FEEDER

BACKGROUND OF THE INVENTION

This invention relates generally to a cage for use with a multiple dosage feeder for an animal cage, which selectively exposes one of a plurality of precise dosages of food or other substances to an animal within the cage while covering the remaining dosages, and more particularly to a door and lock mechanism capable of receiving the multiple dosage feeder.

Animals used in laboratory experiments and housed in cages must be supplied with a nutritionally adequate amount of diet to allow for normal growth and development, as well as to permit such animals to ingest various ingredients in the diet for experimental purposes. While it is often not difficult to encourage an animal to eat, many experimental animals, such as rats and mice, tend to overeat, become obese and eventually develop obesity-related diseases. Unfortunately, such abnormalities in the animal's metabolism may interfere with the experimental end point being studied in an experiment. Accordingly, it is important to administer only a measured dosage of food to such animals to prevent such artifacts and experimental errors. Additionally, in certain experiments, such as those involving toxicological, preclinical testing of pharmaceutical agents and/or nutritional studies, it is important to quantitate the amount of diet or test ingredient agents ingested by an animal. Therefore, it is important to administer only a measured dosage of diet at predetermined intervals to control the intake of diet and the outcome of the experiment.

Heretofore, the administration of measured dosages of food to laboratory animals in cages has been accomplished manually for each feeding interval and for each cage. The manual method of administering measured dosages of food suffers from several drawbacks. The process is slow and cumbersome, requires more frequent handling of the equipment and animals by laboratory personnel and increases the likelihood of error in recording the dosage of food. Additionally, the currently available models of containers have a wide opening and are suitable either to place on the floor of a cage or to affix to a clamp located to the inside of the front frame of the cage. As a result, the laboratory animals are usually found to spill the diet from the container either during the feeding or by playing with the diet especially when it is in the powder form. Such spillage of diet is yet another means of introducing error in recording the dosage of food and/or test agent.

Accordingly, it is desired to provide a multiple dosage feeder for an animal cage which selectively provides one of a plurality of dosages of food to an animal within a cage in a structure which limits the animal to eating a single dosage at a feeding interval, reduces the number of steps and time required to administer measured dosages of food to each cage, indicates whether a particular dosage has been administered, eliminates the necessity of opening the cage to administer the measured dosages of food, and reduces the amount of diet spillage. It is further desired to provide a multiple dosage feeder which can be placed into a housing member which in turn can be placed into and removed from the cage through an opening in the cage.

SUMMARY OF THE INVENTION

In accordance with the instant invention, a multiple dosage feeder for an animal cage provides exact dosages of food with or without added ingredient agents, to an animal within a cage. The feeder is provided with a food holding member and holds a plurality of measured dosages of food. In a preferred embodiment the food holding member is a carousel. An exterior cover plate prevents contamination and access to the dosages of food when they are positioned on the exterior side of the cage. When mounted, at least a portion of the food holding member extends through an opening into a housing member mounted within the cage to the cage interior side of the cage. The cage exterior cover plate has a retained lock mounted on the interior side to slip into a ratchet notch substantially centered within the edge of the housing member cover. The cage exterior cover plate has a plurality of position locks mounted on the exterior side to slip into ratchet notches and hold each dosage of food in position. The interior side of the multiple feeder lies into the housing member which prevents contamination and access to those dosages extending to the cage interior side and selectively provides access to a single dosage of food presented at the cage interior. The housing member is provided with a plurality of retrofit snaps which snap into each side of the cage opening when the trap door is in an open position. In a preferred embodiment, the trap door is spring loaded and provides support for the feeder. The trap door mechanism closes when the feeder is removed thus closing the opening in the cage and returning the cage to its full size and in full view.

Accordingly, it is the object of the invention to provide a multiple dosage feeder which selectively provides one of a plurality of dosages of food to an animal within a cage.

Another object of the invention is to provide a snap-in feeder housing member which is removable thus leaving the cage to its full size and in full view to observe the animal in the cage.

Another object of the invention is to provide a snap-in feeder housing member which is removable through the trap door having a folding solid closure, thus leaving the cage to its full size.

A further object of the invention is to provide a multiple dosage feeder which limits an animal within a cage to eating a single dosage of food at a single feeding interval, while keeping the remaining dosages of food unexposed.

Still another object of the invention is to provide a multiple dosage snap-in feeder housing—multiple dosage feeder unit for an animal cage which does not require that the cage be opened to administer the measured dosages of food.

A yet still further object of the invention is to provide a multiple dosage feeder for an animal cage which permits a plurality of measured-dosage trays or carousels to be stacked for efficient use in an automated food dosage machine and for easy storage.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with accompanying drawings in which.

DETAILED DESCRIPTION OF THE PREFERRED EMBODIMENTS

Figure 1:
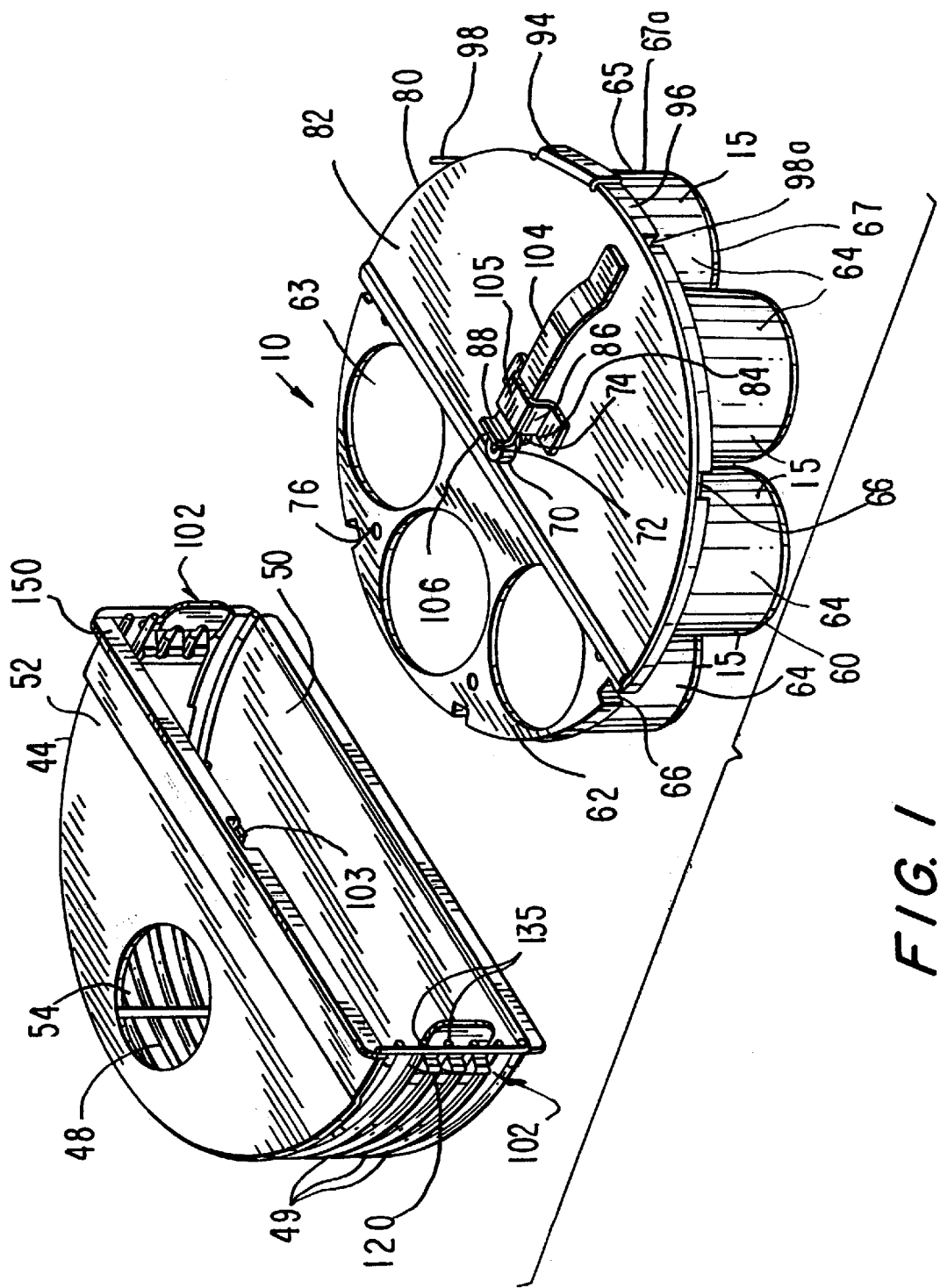
FIG. 1 is a perspective exploded view of a snap-in feeder housing constructed in accordance with the present invention, of a carousel feeder and cover which fits into the feeder housing.
Figure 2:
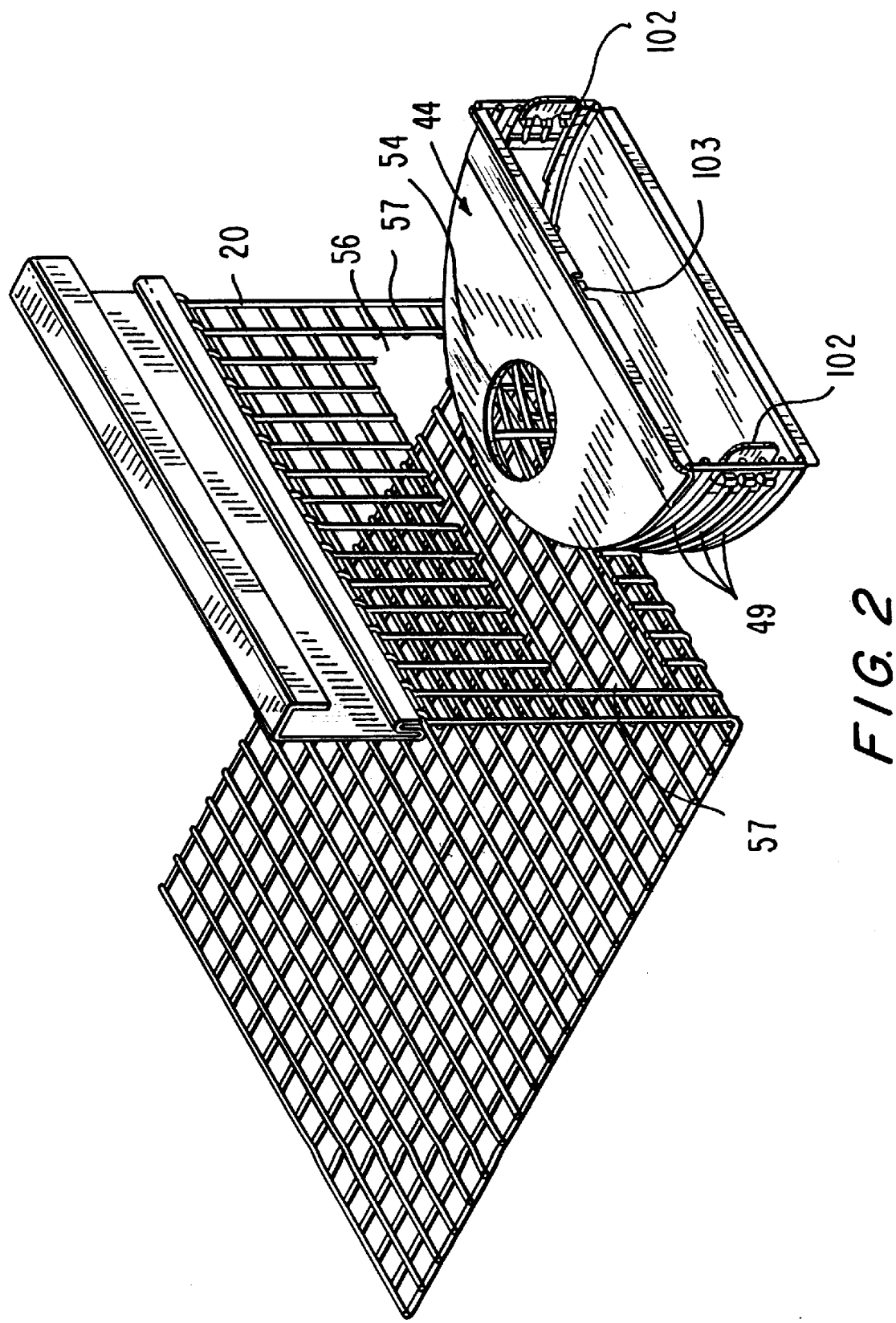
FIG. 2 is an exploded view of cage exterior perspective view of a trap door having no closure and feeder housing member, for an animal cage constructed in accordance with the first embodiment of the present invention.
Figure 5:
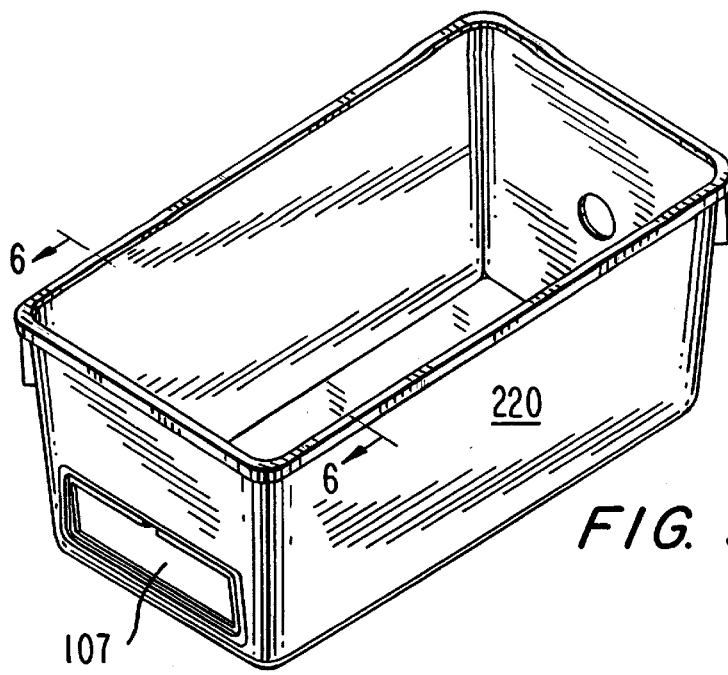
FIG. 5 is a cage exterior perspective view of a trap door with a fold down solid closure constructed for a plastic cage in accordance with still another embodiment of the present invention.

Reference is made to FIGS. 1 and 2 wherein a multiple dosage feeder, generally indicated at 10, and a cage 20 constructed in accordance with the invention is shown. While the present invention is particularly suited for feeding rats and mice, it is to be understood that the invention is equally applicable to feeding other animals, such as guinea pigs, rabbits or cats, for example. Multiple dosage feeder 10 is utilized in conjunction with an animal cage, generally indicated at 20. Although a wire-bar mesh animal cage is depicted and described herein, it is to be understood that multiple dosage feeder may be used with any type of cage, such as cages made of transparent plastic, for example. (FIG. 5). Multiple dosage feeder 10 includes a carousel 60 for holding food, and a cage-exterior cover 80.

Generally speaking, carousel 60 contains measured dosages of food for animals within cage 20. Carousel 60 is slid within a feeder housing member 44 to expose a single dosage of food to animals within cage 20, while a portion of the housing member 44 and cage-exterior cover 80 cover all dosages of food in carousel 60 except for one dosage of food exposed to animals within cage 20.

Carousel 60 comprises a substantially circular tray for holding measured dosages of food for animals within cage 20. Carousel 60 includes a substantially circular platform member 62. A plurality of food containers 64, preferably shaped like cups, depend from platform member 62. Each food container 64 has an open top and may hold a single, measured dosage of food 15 for animals within cage 20 for a single feeding interval. Each container 64 includes side walls 65, a bottom 67 and opening 63 within platform 62. In a preferred embodiment, the outer perimeter of platform member 62 is provided with a plurality of evenly spread ratchet notches 66. One ratchet notch 66 is provided for each food container 64, and ratchet notches 66 are preferably provided at points on the outer perimeter of platform member 62 which are laterally between adjacent food containers 64. Carousel 60 further includes a spindle 70 including a head 72 and a neck 74 which is narrower in diameter than head 72. Platform member 62 may also be provided with a plurality of indicia 76 near the outer perimeter of platform member 62 between adjacent food containers 64 or on outer surfaces of individual food containers to indicate which container 64 is being presented to an animal within cage 20. Platform member 62 and containers 64 of carousel 60 are preferably constructed as an integral unit from a durable and easily cleaned material such as plastic. Spindle 70 is preferably constructed of a wear-resistant material such as stainless steel.

Figure 3:
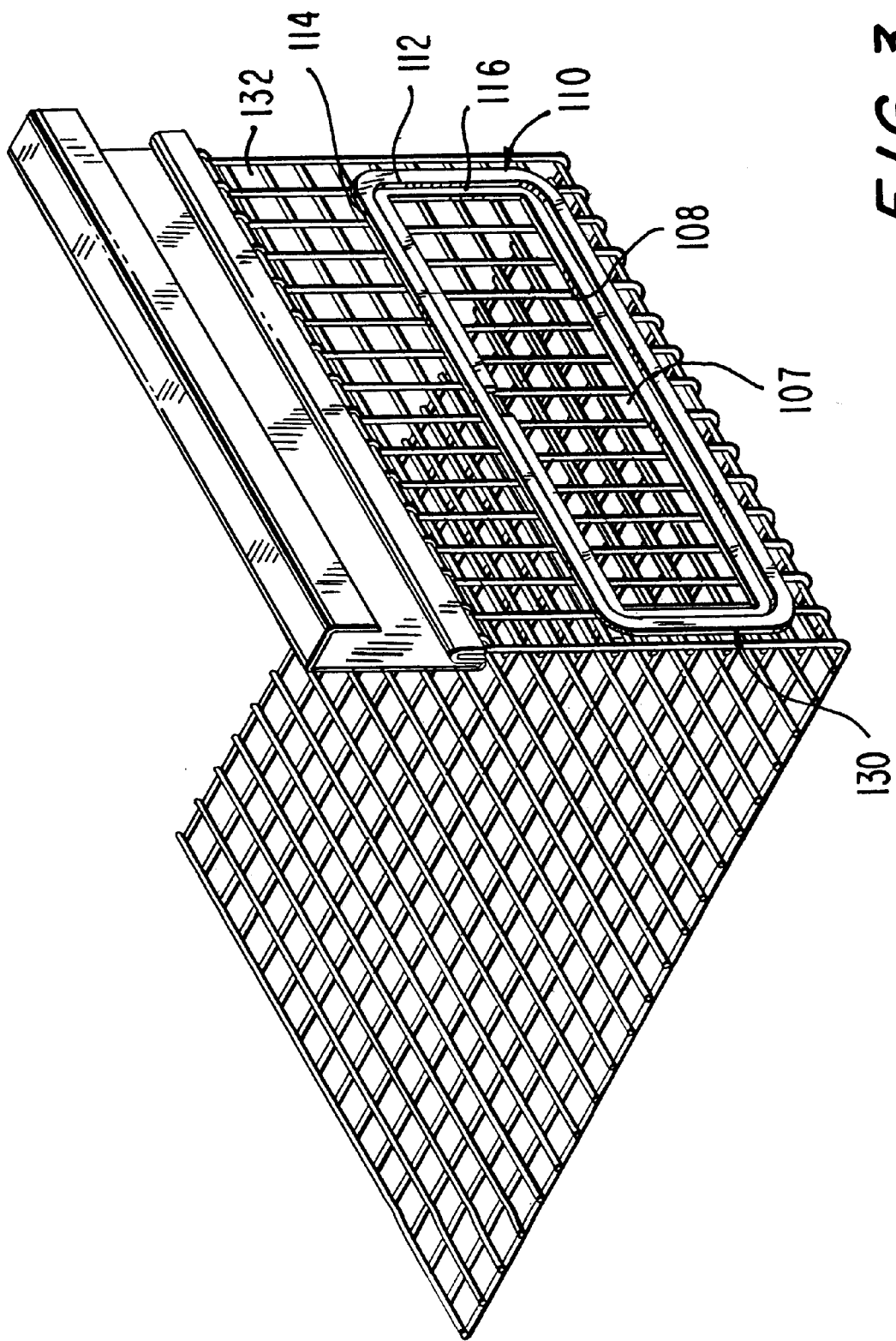
FIG. 3 is a cage-exterior perspective view of a trap door with a folding mesh closure constructed in accordance with another embodiment of the present invention.

As shown in FIGS. 1 and 2, feeder housing member, generally indicated at 44 includes a semicylindrical peripheral guard 48 extending across the opening 56 in the cage. Peripheral guard 48 defines a carousel receiving opening 56 within cage 20. In a preferred embodiment peripheral guard 48 is formed of a plurality bars 49 extending along the periphery of housing member 44. Feeder housing member 44 further includes a lower housing floor 50 forming a floor to peripheral guard 48 and a cage interior cover 52 forming a covering to the area defined by peripheral guard 48. Peripheral guard 48 and lower housing floor 50 may be constructed of a wirebar mesh as shown in FIGS. 1 and 3, or a perforated plate, or solid floors, or solid walls, or other configurations. Feeder housing member 44 generally prevents animals within cage 20 from escaping through the opening 56 of cage 20. However, feeder housing member 44 extends into a host cage making an area of the cage interior unavailable to animals contained therein.

Cage-interior cover 52 is constructed of a rigid material resistant to biting and scratching of animals within the cage, such as stainless steel. Peripheral guard 48, lower housing floor 50 and cage interior cover 52 together form an enclosure which is dimensioned to receive sufficient portion of carousel 60 to be positioned on the cage-interior side of cage opening 56 (that is, the side of cage 20 in which animals are housed).

As shown in FIGS. 1 and 2, cage interior cover 52 is provided with a feeding opening 54 which is shaped and sized as to permit access to a single container 64 of carousel 60 therethrough, while the remainder of cage interior cover 52 is solid so as to cover the tops of all other containers 64 on the cage-interior side of cage opening 56.

Feeder housing member 44, as shown in FIGS. 1 and 2 is now capable of sliding in and out of the cage opening 56. The housing member 44 is provided at each end with a retrofit snap generally indicated as 102, which snap into each end of the cage opening 56. Retrofit snaps 102 include elbows 135 formed at a free end of at least one of wire bars 49. Elbows 120 extend from the exterior periphery housing member 44 and have a substantially u shape. Tabs 102 are affixed to the free ends 135 of elbows 120 so that movement of tabs 102 towards each other cause elbows 120 to withdraw within housing member 44. As shown in FIGS. 1 and 2, feeder housing member 44 also includes a ratchet notch 103 substantially centered within the edge of cage interior cover 52 in the horizontal direction.

As shown in FIG. 1, cage-exterior cover 80 includes a solid cover plate 82. Cover plate 82 is dimensional so as to cover the tops of containers 64 of carousel 60 which are on the cage-exterior side of the cage opening 50 when carousel 60 is slid into the housing member as described below. In a preferred embodiment, cover plate 82 is semicircular to cover those portions of carousel 60 not covered by cage-interior cover 52, with the exception of feeding opening 54. Cover plate 82 is provided with a keyhole-shaped aperture 84 comprising a circular wide opening 86 communicating with a U-shaped narrow opening 88, and U-shaped narrow opening forming the center of the circle about which semicircular plate 82 is dimensioned. Wide opening 86 allows head 72 of spindle 70 to pass therethrough. Narrow opening 88 allows neck 74 of spindle 70 to pass therethrough but closely surrounds neck 74, thereby preventing head 72 from passing vertically therethrough yet permitting neck 74 to freely rotate within narrow opening 88.

Cage exterior cover 80 may also include a ratchet stop 96 attached to a flange 94 which depends from the outer perimeter of cover plate 82. Ratchet stop 96 comprises a bent band of a resilient material, such as stainless spring steel, and is provided with at least one, and preferably two, teeth 98 which are biased by the resiliency of the material toward aperture 84. Teeth 98, 98a are disposed at a distance from one another substantially equal to the distance between adjacent ratchet notches 66 on carousel 60 so as to be received in a respective ratchet notch 66 as ratchet notches 66 are rotated to pass beneath teeth 98, 98a. Teeth 98, 98a are formed at opposing angles. Accordingly, if tooth 98 is disengaged, rotation of carousel 60 is permitted in the counterclockwise direction (with respect to the view depicted in FIG. 1) but prevented from rotation in the clockwise direction by tooth 98a. Likewise, rotation of carousel 60 is permitted in the clockwise direction when tooth 98a is disengaged from ratchet notch 66 and prevented in the clockwise direction by tooth 98. Accordingly, a simple one-handed operation of carousel 60 is provided. Tooth 98 or 98a is disengaged from ratchet notch 66 through the use of an operator's thumb finger and the remaining fingers/thumb are used to rotate carousel 60 in the allowable direction. In a preferred embodiment, tooth 98 is larger and easier to disengage than tooth 98a, thus encouraging the selective disengagement of tooth 98 to thereby encourage rotation of carousel 60 in a single direction.

Cover plate 82 includes a flexible strip 104 which is disposed near aperture 84 and held in position by a cover slip 105 placed at right angles to strip 104 at a first end and is attached at the second end to the outer perimeter of cover plate 82. In a preferred embodiment strip 104 is made of stainless steel. The first end of strip 104 ends upwardly into a retaining flange 106. Accordingly, when the multiple feeder 10 is slid into the housing member 44, flange 106 at one end of flexible strip 104 snaps into the notch 103 in the housing member 44.

To assemble multiple dosage feeder 10, cage-exterior cover 80 is first placed atop carousel 60. In particular, head 72 of spindle 70 is passed through wide opening 86 of aperture 84, and cage-exterior cover 80 is then slid laterally along platform member 62 of carousel 60 so that neck 74 of spindle 70 is received within narrow opening 88, and head 72 is positioned above at least a portion of cover plate 82 surrounding narrow opening 88, thereby securing cage exterior cover 80 to carousel 60. In addition, cage-exterior cover 80 is rotated about spindle 70 so that teeth 98 of ratchet stop 96 are received within ratchet notches 66 on carousel 60, thereby preventing rotational movement of cage-exterior cover 80 with respect to carousel 60.

Next, the portion of carousel 60 which is not covered by the cage exterior cover 80 is then inserted into housing member 44 through the carousel opening as flange 106. Shown in FIGS. 1 and 2 strip 104 is pressed down allowing retaining flange 106 to slip into notch 103 of the housing member 44 and released to snap tightly.

Next, the carousel 60 and housing member 44 assembly is inserted through the cage opening 56 of cage 20. The edges 57 of opening 56 ride along elbows 120 which, as a result of the coming action of the sloped sides of u shaped elbows 120, deflect elbows 120 into housing member 44. This allows elbows 120 to pass edges 57. Once past, the inherent bias of deflected bars 49 cause the two retrofit snaps 102 snap into each end of the cage opening 56. Edges 57 are secured behind u shaped elbows 120 preventing inadvertent release of housing member 44.

Figure 6:
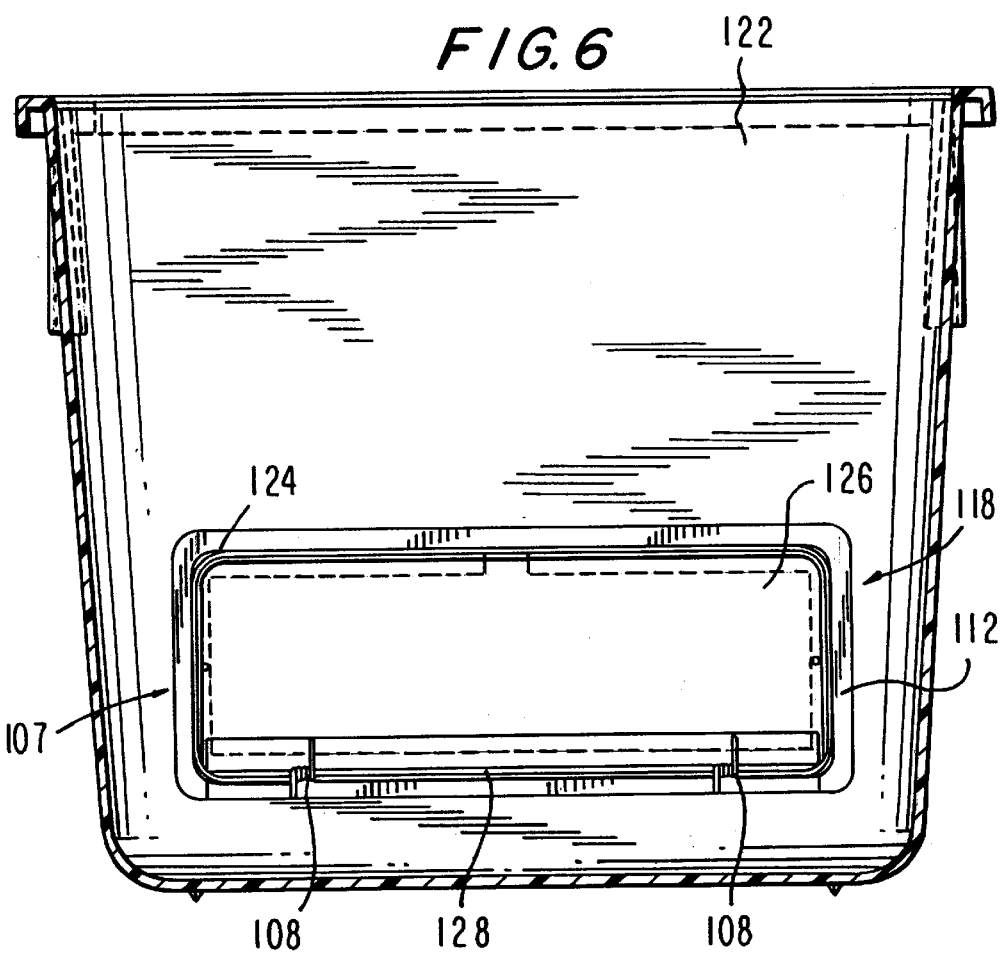
FIG. 6 is a front elevational view of a trap door and cage.

The embodiment shown in FIGS. 1–3 allows for quick and simple removal of housing member 44. However, removal of housing member leaves an opening in cage 20. Accordingly, in a second embodiment, a door is provided to close the opening. Reference is now made to FIGS. 5 and 6 in which a second embodiment of a cage, generally indicated 120, constructed in accordance with a second embodiment of the invention is provided. Cage 120 is a unitary construction cage made out of a plastic such as the Lab Products microisolator cage and includes at least a front wall 122. An opening 124 is formed in front wall 122. A door construction generally indicated as 107 is disposed within opening 124. Door construction 107 includes a frame 110 having an outer flange 112 and an inner flange 114 (FIG. 3) for securing a portion of front wall 122 therebetween. A door panel 126 (FIG. 6) is pivotally secured to frame 110 by a flange 128. Door panel 126 is movable between a first position in which it is substantially parallel to frame 110 closing opening 124 in front wall 122 and a second position in which it is substantially perpendicular to frame 110. Springs 108 are mounted on flange 128 for biasing door panel 126 into the first position.

Figure 4:
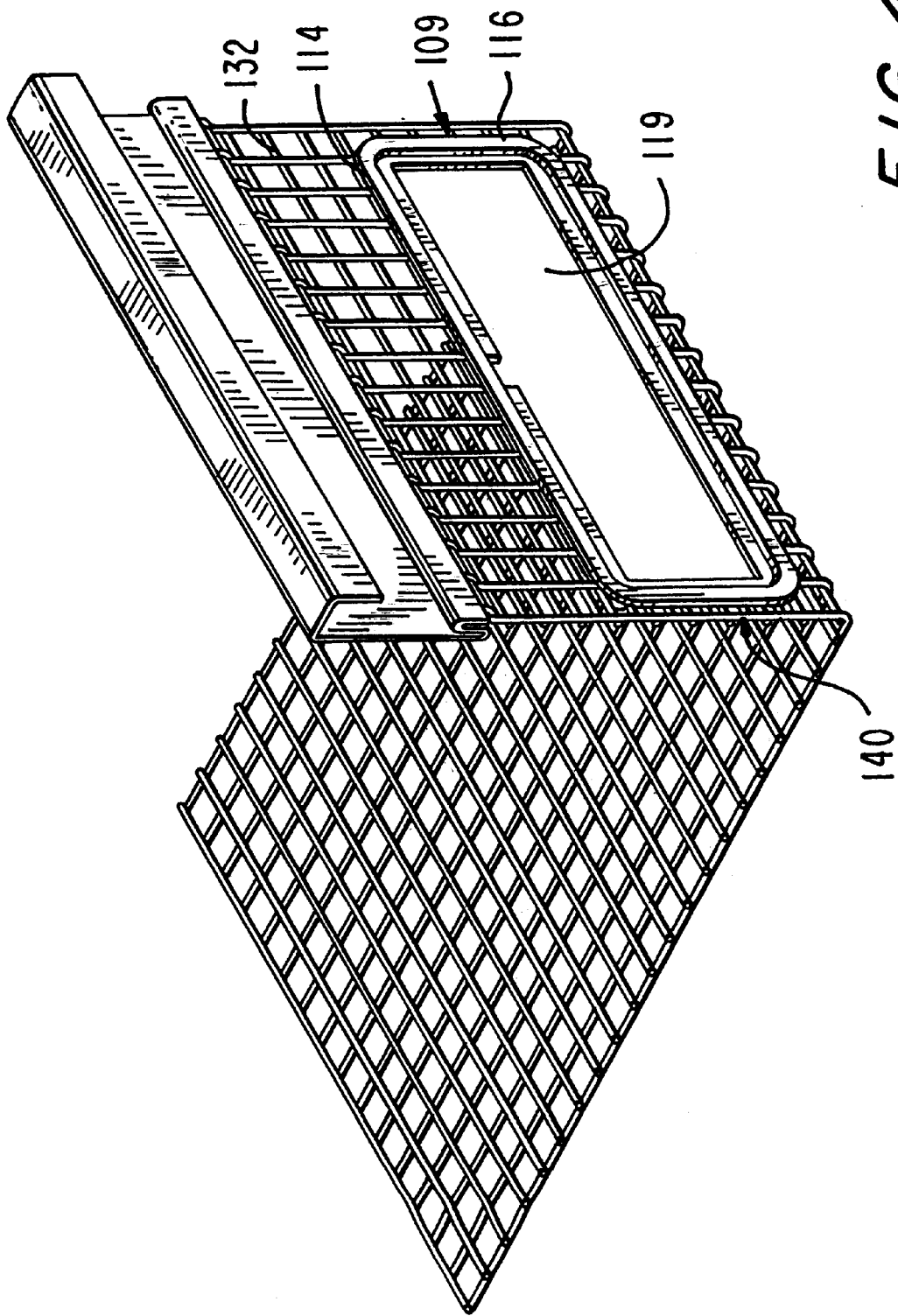
FIG. 4 is a cage-exterior perspective view of a trap door with a fold down solid closure constructed in accordance with yet another embodiment of the present invention.

When a housing member 44 is inserted into opening 124 in a front wall 122 it pushes door panel 126 towards the second substantially perpendicular position allowing housing member 44 to be slid into position extending into cage 120. Because panel 126 is biased towards the first position, it applies a force against floor 50 of housing member 44 supporting member 44 when housing member 44 is disposed inside the cage secured to frame 110 (FIG. 4). When housing member 44 is removed from the cage, springs 108 (FIG. 6) bias door panel 126 into the closed position, restoring the floor area of the cage to its original amount, prevent animals from escaping, and prevent contamination from entering through the opening 124. Furthermore, by forming door panel 126 of a see-through material, the visibility of the animals is even further enhanced when compared to the housing member 44 being disposed within the cage or if door panel 126 were opaque.

Reference is now made to FIG. 3 in which a third embodiment of the invention having a see-through door, the primary difference between cage 130 and cage 220 (FIG. 5 & 6) being the use of a wire mesh cage and wire mesh door. Like numerals are utilized to indicate like structure. Cage 130 is formed with a front wall 132 formed of wire mesh. An opening is formed within front wall 132 and a frame 110 is provided therein. Frame 110 includes an outer flange 112 and an inner flange 114 exposed on the exterior and interior sides of front wall 132 respectfully to anchor frame 110 to front wall 132. A mesh door 116 is pivotably mounted to frame 110 utilizing a hinge and spring construction like that in cage 220. Because of the use of a mesh door 116, it becomes possible to view the animals inside cage 130 without changing the overall look of the cage 130.

Reference is now made to FIG. 4 in which a cage, generally indicated as 140, constructed in accordance with a fourth embodiment of the invention is provided. The difference between cage 140 and 130 is the use of a solid metal plate as the door. Like structures are indicated with like numerals to facilitate description.

Cage 140 includes a front wall 132 having a hole therein. A door 109 includes a frame 110 having an outer flange 112 and an inner flange 114 for securing door 109 to front wall 132. A door panel 119, formed as a solid sheet of metal is pivotably affixed to frame 110 utilizing a hinge and springs to bias the door into a closed position as in cage 220.

During use, a prescribed dosage of food 15 is placed in each container 64 of a carousel 60. Each carousel 60 is then incorporated into a multiple dosage feeder 80 as described above. When fully assembled, multiple dosage feeder 10 presents the contents 15 of one container 64 of carousel 60 to animals within cage 20 through feeding opening 54 of housing member 44. Housing member 44 prevents animals within cage 20 from gaining premature access to other dosages of food, and housing member 44 protects carousel 60 itself from damage incurred by animals within cage 20.

Housing member 44 is slid into opening 124 of the cage 120, by way of example, causing door panel 126 to move from the closed position to an open position. As housing member 44 is moved farther into opening 124, elbows 135 are forced inwardly to clear frame 112. Once ends 135 of elbows 120 have moved past frame 110, they are biased into position behind inner flange 114 preventing movement of housing member 44 in a direction preventing movement of the flange to remove housing member 44 from the cage. As a result of the biasing force provided by springs 108, door panel 126 supports housing member 44 while it is disposed within hole 124.

Multiple dosage feeder 10 is then slid into housing member 44. The strip 104 is deflected downward so that flange 106 clears cage interior cover 52. Spindle 70 and flange 106 pass through notch 103. Once clear of notch 103, strip 104 is released so that flange 106 comes in contact with flange 150 of cage interior cover 52 for preventing inadvertent removal of multiple dosage feeder 10.

Ratchet notches 66 of carousel 60 and teeth 98 of ratchet stop 96 are configured and disposed so that when teeth 98 are received by ratchet notches 66, exactly one container 64 is aligned with feeding opening 54. Ratchet stop 96 holds carousel 60 in place preventing rotation of carousel 60 by the animal, maintaining only the desired container 64 in the exposed orientation. The desired container 64 may have inscribed on the side 65 the day of the week or the test diet and may indicate information regarding the food 15 of the particular container 64 which is exposed to the animal within cage 20 through feeding opening 54 of food presentation housing member 44. For example, seven containers 64 could be provided in carousel 60, for each day of a week, and the day inscribed on side 65 could indicate which day's food 15 is being administered to the animal within cage 20.

When it is necessary to present a fresh, measured dosage of food 15 to the animal within cage 20, carousel 60 is simply rotated with respect to aperture 84. In particular, one tooth 98, 98a is disengaged and carousel 60 is rotated to force teeth 98, 98a of ratchet stop 96 outwards, and carousel 60 is rotated until teeth 98, 98a are received by the next notch 66 or notches 66 in carousel 60 along the outer perimeter of plate member 62 thus indexing the food relative to opening 54. Once this has occurred, a new container 64 with fresh food or other substances 15 is presented to the animal within cage 20 through feeding opening 54 of food housing member 44. In addition, the day of the week or the test diet is inscribed on wall 65 of container 64 to indicate to laboratory personnel that a new dosage of food 15 has been administered to the animal.

Thus, a plurality of dosages of food or other materials may be measured into containers 64 of carousel 60 and loaded simultaneously into multiple dosage feeder 80. At any particular time, the contents of only one container 64 are presented to an animal within cage 20 through feeding opening 54 of cage interior 44. The remainder of the containers 64 are covered, and the contents 15 therein are kept protected from contamination by cage interior cover 52 or cage-exterior cover 80. If it is desired to remove multiple dosage feeder 10 and/or housing member 44 to restore the usable area within the cage to its original amount, then multiple dosage feeder 10 is removed from housing member 44. Strip 104 is deflected downwards against its natural bias so that flange 106 clears flange 150 and passes through notch 103. In this way multiple dosage feeder is slid from housing member 44. Tabs 102 of retrofit snaps 102 are then depressed towards each other to withdraw ends of elbows 120 within housing member 44 allowing housing member 44 to pass frame 110 so that housing member 44 may be slid out from opening 124. As housing member 44 is removed from cage 220, door panel 126 rotates from a substantially perpendicular position to a closed position.

Carousel 60 is preferably configured such that a first carousel 60 is stackable and/or nestable upon a second carousel 60. Side walls 65 are tapered slightly inward from opening 63 to bottom 67 so that bottoms of first carousel 60 partially fit within openings 63 of second carousel 60. The exterior corner of each first and second bottom 67 has a first and second corner radius 67a to control partial stacking or nesting. First, bottom 67 is dimensioned relative to second opening 63 so that only a portion of corner first radius 67 fits within second opening 63. This corner radius is reflected within the container also to make it easy for the animal to remove food from the interior corners and to aid in container cleaning. In this manner, a plurality of carousels 60 may be stacked upon one another for easy destacking without jamming or wedging together. Such stacking reduces storage space for carousels 60 when not in use. This stackability also facilitates automated filling of containers 64 by presenting a convenient format wherein the partially nested carousel containers and notches are rotationally aligned for loading a plurality of securely grouped carousels 60 into a machine capable of quickly removing one carousel 60 from the stack, locating and filling all of the food containers 64 therein with measured dosages of food or other substances, and then loading the next carousel 60.

The slight taper of side walls 65, corner radius 67a, and flat bottoms 67 provide for a shallow nesting of first carousel 60 into second carousel 60. As a result, a first bottom 67 nesting within an opening 63 of second carousel 60 leaves enough clearance within second container 64 so that food can be placed within container second 64 without being contaminated by a nesting first carousel 60. As a result, carousels 60 can be placed in a nested condition even after having been loaded with food, thus saving space and making transport of food to the animals more efficient. In addition, this shallow nesting prevents nested carousels 60 from "sticking" to each other such that they become difficult to separate. Further, this nesting coordinates proper orientation of all of the carousel notches 66 in the stack for automatic dispensing from the stack in the machine thus enabling filling of all containers 64 simultaneously without crossmigration of food between containers 64 or spillage of food outside the containers 64.

By providing a multiple dosage feeder with a plurality of containers, a plurality of dosages of food can be measured into and loaded and mounted to an animal cage simultaneously. By also providing a multiple dosage feeder to fit into a feeder housing member having a food opening which is coextensive with a single food container, a single dosage of food from a multiple dosage feeder can be presented to an animal within an animal cage. By providing a multiple dosage feeder for an animal cage which locks into a protective feeder housing member, and an opening in the cage for receiving the housing member and the multiple dosage feeder containing a plurality of food containers, multiple dosages of food can be selectively presented to animals within a cage without opening the cage. In addition by providing a multiple dosage feeder with covers for all but one of the food containers, food or other substances within the containers may be kept protected from contamination or other damage until presented to the animal within a cage. By providing a lock on the exterior cover plate of the carousel the multiple dosage feeder is capable of sliding in and out of the housing member with ease. By providing a housing member which snaps into the opening or trap door in the cage it is possible to remove the housing member and the multiple dosage feeder and return the cage to its full size and full view. By providing a trap door mechanism which is spring loaded to close when the housing member is not in place, the door closes the opening in the cage and prevents animals from escaping. By further providing a multiple dosage feeder having food containment carousels which are stackable upon one another, storage space for unused carousels is reduced, shipping costs are consequently reduced, and automated filling of food containers within the carousel is facilitated.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, must be said to fall therebetween.

What is claimed is:

1. A cage for receiving a dosage feeder, the cage having a wall comprising:
    a feeder housing member releasably supported within said wall;
    a food holding member mounted into the feeder housing member, at least a portion of the food holding member extending within said cage; and
    the feeder housing member disposed in an opening in the cage, the feeder housing member permitting access to said food by an animal within the cage, and snap lock means for releasably securing said feeder housing member to said wall, the feeder housing member including a peripheral guard for guarding the periphery of the food holding member from the animal within the cage, said snap lock means being mounted on said peripheral guard and moveable between a position within said feeder housing member to a position extending outside said feeder housing member, said peripheral guard biasing said snap lock means to extend outside said feeder housing member.

2. A cage for receiving a dosage feeder, the cage having a wall comprising:
    a feeder housing member releasably supported within said wall;
    a food holding member mounted into the feeder housing member, at least a portion of the food holding member extending within said cage; and
    the feeder housing member disposed in an opening in the cage, the feeder housing member permitting access to said food by an animal within the cage, and snap lock means for releasably securing said feeder housing member to said wall, the food holding member further comprising a lock, and the food holding member being releasably fastened at the lock to the feeder housing member.

3. The cage of claim 2, wherein the lock further comprises:
    a strip having a first end and a second end, the second end attached to the food holding member, and
    a notch formed in said feeder housing member adapted to receive and engage said first end of said strip to lock said food holding member to said feeder housing member.

4. The cage of claim 3, further comprising a flange affixed to said first end of said strip, and wherein said strip is movable between a first position in which said flange passes through said notch and a second position in which said flange interlocks with said notch.

5. A cage for receiving a dosage feeder, the cage having a wall comprising:
    a feeder housing member releasably supported within said wall;
    a food holding member mounted into the feeder housing member, at least a portion of the food holding member extending within said cage; and
    the feeder housing member disposed in an opening in the cage, the feeder housing member permitting access to said food by an animal within the cage, and snap lock means for releasably securing said feeder housing member to said wall, the opening formed in said wall; and
    a door panel pivotally mounted within said opening and movable between a first position substantially closing said opening, and
    a second position allowing said feeder housing member to be disposed in said opening.

6. The cage of claim 5, further comprising biasing means for biasing said door panel to said first position.

7. The cage of claim 5, wherein said door panel supports said feeder housing member when said feeder housing member is disposed within said opening.

8. The cage of claim 5, wherein said door panel is spring loaded on the cage-interior side of the opening in the cage.

9. The cage of claim 5, wherein the door panel is made of wire mesh.

10. The cage of claim 5, wherein the door panel is made of a solid surface.

11. A cage for receiving a dosage feeder, the cage having a wall comprising:
    a feeder housing member releasably supported within said wall;
    a food holding member mounted into the feeder housing member, at least a portion of the food holding member extending within said cage; wherein the food holding member includes a lock, and the food holding member being releasably fastened at the lock to the feeder housing member, the lock further compromising a strip having a first end and a second end, the second end attached to the outer perimeter of a multiple dosage feeder, and a notch formed in said feeder housing member adapted to receive and engage said first end of said strip to lock said food holding member to said feeder housing member; and
    the feeder housing member being disposed in an opening in the cage, the feeder housing member permitting access to said food by an animal within the cage.

* * * * *